T. S. BARWIS.
DREDGING SCOOP.
APPLICATION FILED MAY 19, 1908.
956,269.
Patented Apr. 26, 1910.
2 SHEETS—SHEET 1.
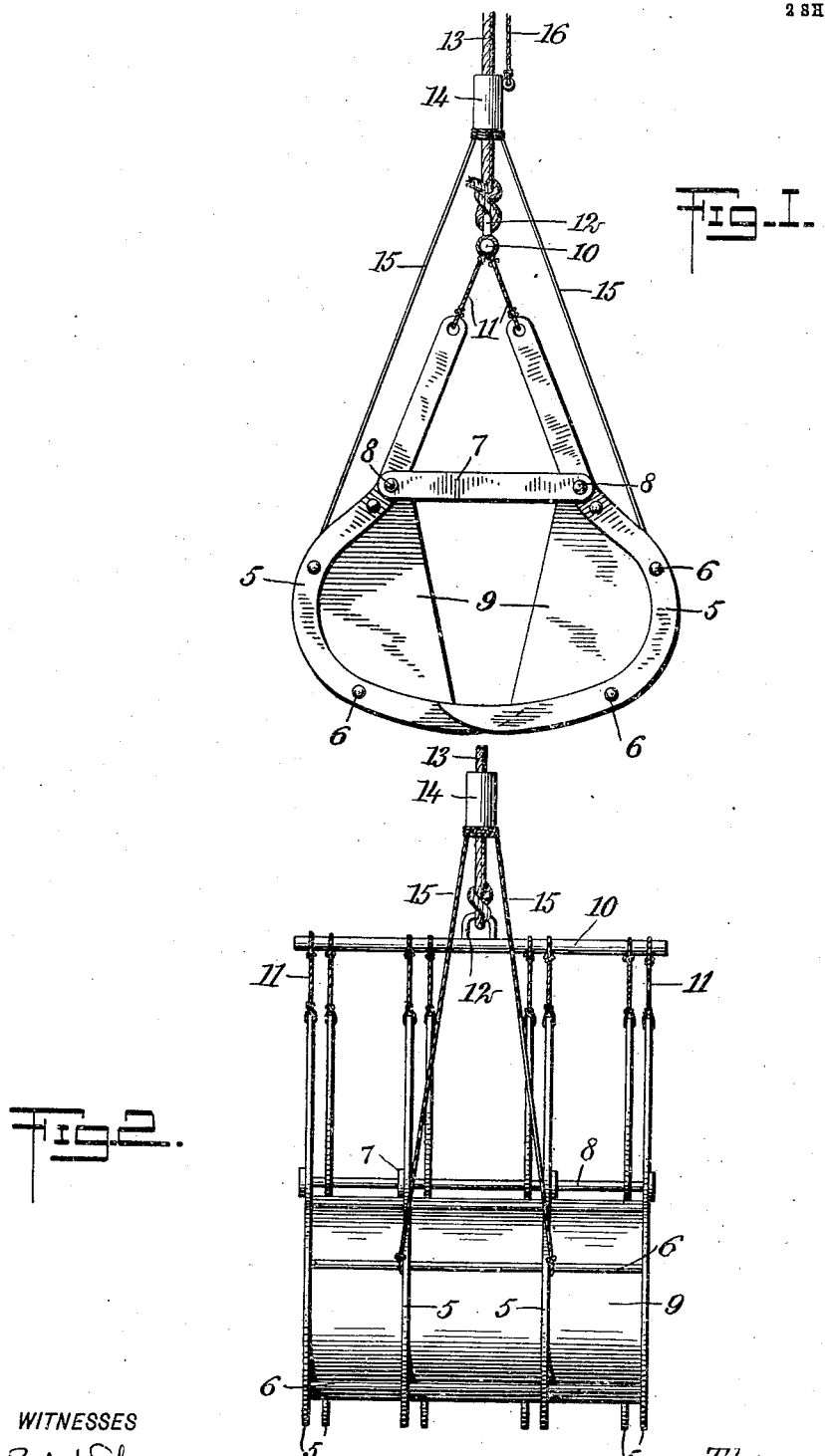
WITNESSES
G. Robert Thomas
INVENTOR
Thomas S. Barwis
BY
ATTORNEYS T. S. BARWIS.
DREDGING SCOOP.
APPLICATION FILED MAY 19, 1908.
956,269.
Patented Apr. 26, 1910.
2 SHEETS—SHEET 2.
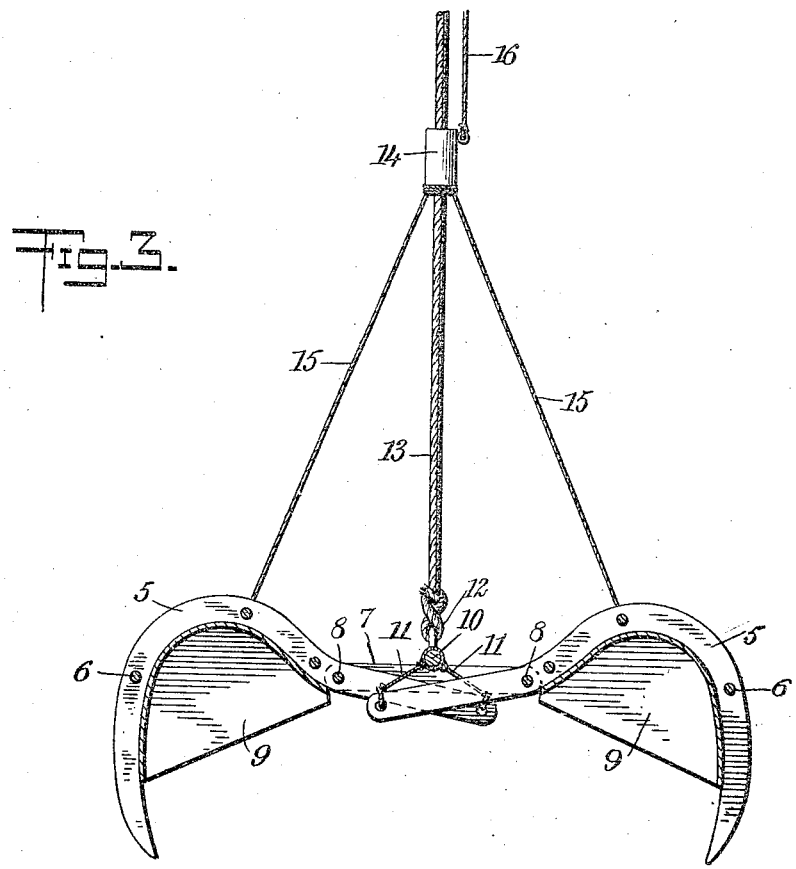
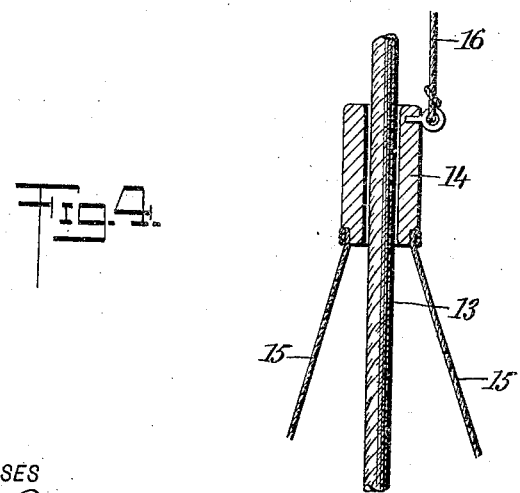
WITNESSES
INVENTOR
Thomas S. Barwis
BY
ATTORNEYS

UNITED STATES PATENT OFFICE.

THOMAS SHEPPARD BARWIS, OF VANCOUVER, BRITISH COLUMBIA, CANADA.

DREDGING-SCOOP.

956,269. Specification of Letters Patent. Patented Apr. 26, 1910.

Application filed May 19, 1908. Serial No. 433,638.

*To all whom it may concern:*

Be it known that I, THOMAS S. BARWIS, a subject of the King of Great Britain, and a resident of Vancouver, British Columbia, Dominion of Canada, have invented a new and Improved Dredging-Scoop, of which the following is a full, clear, and exact description.

This invention has reference to improvements in dredging scoops for loading and unloading coal and such other material from ships, etc., as also for dredging in rivers, harbors, and in many other relations.

The object of the invention primarily is the provision of a scoop essentially consisting of two opposed scoop members having a pivotal movement to and from each other, and which are operable to effectively claw or dig up the material preparatory to gathering it in.

The invention further resides in a novel means for swinging the scoop members to and from each other.

Reference is to be had to the accompanying drawings forming a part of this specification, in which similar characters of reference indicate corresponding parts in all the views.

Figure 1 is an end view of a dredging scoop embodying my improvements; Fig. 2 is a side view of the same; Fig. 3 is a sectional view through the scoop, showing the scoop members distended; and Fig. 4 is a sectional view through the sleeve and adjacent parts forming a feature of the construction.

A scoop constructed in accordance with my invention includes two opposed scoop members each comprising a plurality of hooks 5, having pointed lower extremities and off-set apertured shanks; the hooks of each scoop member being rigidly connected together by a suitable number of longitudinally-arranged bars 6.

The two opposed members of the scoop are connected together by links 7, each being preferably secured or journaled at its opposite ends to longitudinally-arranged bars 8, the latter passing through the hooks at the lower portions of their shanks. This construction permits of the shanks of the hooks of the two scoop members overlapping each other at the side of the links when the scoop members are swung open, as illustrated in Fig. 3. Each scoop member is preferably provided with a detachable lining 9, which seats on the inner edges or faces of the hooks and extends near to, but falls short of, the pointed lower extremities thereof, whereby the linings will not interfere with the clawing or digging action of the hook preparatory to gathering in a scoop of material. The linings 9 are provided with end pieces, as clearly shown in Figs. 1 and 3, to prevent the load from passing out at the ends of the scoop.

The upper extremities of the shanks of the hooks 5 have apertures for connecting them with a suspending bar 10; this connection being effected by the cords or other flexible members 11. The suspending bar 10 is provided at substantially its center with a staple 12, or other convenient attaching device for securing a cable 13; the latter serving to raise and lower the scoop and shift it about.

For operating the scoop sections, a sleeve 14 is slidable on the cable 13, and is connected to the said members preferably at the opposite sides of the transverse center by the lines 15, the connection with said members being made at a substantial distance below the pivots or bars 8, in order that sufficient leverage may be obtained. The sleeve 14 is moved over the cable 13 by a line 16, connected thereto and passing to a convenient point of operation.

The scoop as shown and described while being the preferred practical construction of my improvement, the same may nevertheless be modified within the limits defined by the claims annexed.

Having thus described my invention, I claim as new and desire to secure by Letters Patent:

1. In a dredging scoop, two opposed scoop members, each comprising a plurality of hooks rigidly connected together, links connecting the hooks of the opposed members of the scoop, a suspending bar flexibly connected with the hooks and having a cable connected thereto for raising and lowering the scoop, and a sleeve slidable on said cable having connections with the scoop members.

2. A dredging scoop, comprising two opposed scoop members having links pivotally connecting them together, a suspending bar flexibly connected to said members and having a cable for raising and lowering the scoop connected thereto, a sleeve slidable on the cable having lines connecting it with the scoop members, and a line for operating the sleeve connected thereto.

3. In a dredging scoop, two opposed scoop members each comprising a plurality of hooks rigidly connected together, the hooks of the scoop members having shanks movable over each other when the scoop member is open and separating when the scoop member is closed, and links arranged transversely of the scoop, connecting the shanks of the opposite hooks.

4. In a dredging scoop, two opposed hook-shaped scoop members, links connecting the upper portions of said members together, a suspending bar flexibly connected thereto for raising and lowering the scoop, a sleeve slidable on the cable having lines connecting it with the scoop members, and a line for operating the sleeve.

5. In a dredging scoop, two opposed scoop members, each comprising a plurality of hooks having pointed free ends and rigidly connected together, and a lining seated on the hooks of each member falling short of the free pointed ends thereof, adapting said ends of opposite scoop members to intermesh with each other when the scoop is closed.

In testimony whereof I have signed my name to this specification in the presence of two subscribing witnesses.

THOMAS SHEPPARD BARWIS.

Witnesses:
W. POLLARD GRANT,
J. H. MACFIN.